United States Patent Office 3,058,892
Patented Oct. 16, 1962

3,058,892
SEPARATION OF BETA-BROMOETHYLBENZENE FROM ALPHA-BROMOETHYLBENZENE BY DISTILLATION
Frank J. Plesmid, Westfield, N.J., assignor to E. I. du Pont de Nemours and Company, Wilmington, Del., a corporation of Delaware
No Drawing. Filed Nov. 7, 1960, Ser. No. 67,461
1 Claim. (Cl. 202—57)

This invention relates to the treatment of bromoethylbenzene compositions. More particularly, it relates to the removal of α-bromoethylbenzene from mixtures with β-bromoethylbenzene.

The presence in β-bromoethylbenzene of its alpha isomer, even in small quantities, makes the beta isomer less suitable for some industrial uses, such as in the preparation of sodium styrene sulfonate. Conventional separation procedures, such as distillation, have not proven completely satisfactory because of the close boiling points of the alpha and beta isomers.

According to the present invention, α-bromoethylbenzene is effectively removed from a mixture of α and β-bromoethylbenzene by admixing zinc oxide with the composition, heating the admixture and then distilling the admixture to obtain essentially 100% pure β-bromoethylbenzene in the distillate. It is preferred but not essential that the admixing be carried out in an inert organic solvent for the bromoethylbenzene. Conditions will preferably be anhydrous but a small amount of water has been found to not interfere seriously in the process.

A simplified flow diagram of the process of this invention is as follows:

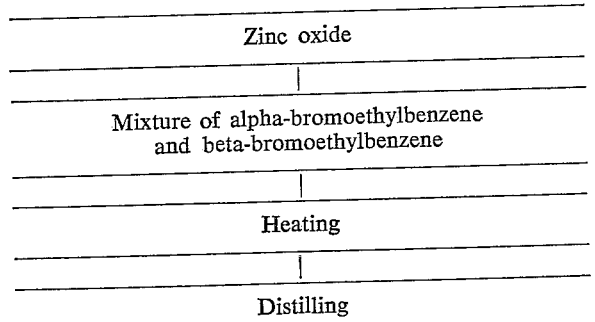

The composition being treated can contain up to as high as 50% or more of either of the alpha or beta isomers with considerable benefit being obtained according to the present invention concept. In most circumstances, however, the composition will be at least 90% by weight of beta isomer and preferably only from about 0.2% to 10% of the undesired alpha isomer.

The zinc oxide can be used effectively in an amount from about 25 to about 100 parts by weight of zinc oxide per million parts of the total alpha plus beta isomers present. Generally, within this range of zinc oxide, the more alpha isomer present, the more zinc oxide that will be required for optimum results. The zinc oxide can be admixed conveniently in its dry powder form or, if a solvent is used, introduced as a suspension or slurry in a small amount of the inert organic solvent. Excessive amounts of zinc oxide have been found harmful since breakdown of the beta isomer may occur if too much zinc oxide is used.

Heating of the admixture containing the zinc oxide can be done at a temperature in the range from about 75° to about 180° C., with the highly preferred temperature range from 100° to 150° C. A heating time of about 15 minutes to 5 hours or so is satisfactory, although, of course, a shorter time can be used with some benefit and a longer time is merely less convenient. In general, both heating time and temperature are minimized in order to minimize concurrent breakdown of the beta isomer.

Distillation of the heat-treated composition can be by any convenient conventional apparatus and method, whether batch, continuous, vacuum, or any other procedure known for distillation. Pot temperature during distillation at the preferred operating pressure of about 50 millimeters of mercury will be about 135° C.

This solvent referred to above, if used, is not considered particularly critical and a suitable one can readily be selected by persons skilled in the art in accordance with conventional chemical procedures. This solvent should be miscible with the bromoethylbenzene components and substantially inert to hydrogen bromide and styrene. The solvent also will have a boiling point of less than that of β-bromoethylbenzene, namely, about 220° C. at atmospheric conditions.

Suitable solvents include many well known, commercially available saturated hydrocarbons. Typical straight chain aliphatic hydrocarbons are n-pentane, n-hexane, n-heptane, and n-octane. Typical commercial products are Esso Standard Oil Company Hexane, B.P. range 66.5° C. to 69.5° C., and Heptane, B.P. range 94.0° C. to 99.0° C. In the normal commercial sense, the named commercial hydrocarbons are "narrow cut" petroleum fractions which may in fact contain appreciable amounts of other hydrocarbons having similar boiling points. Thus, the named hydrocarbons can be present in amounts of perhaps 40% to 80% of the total. In addition to the above mixed fractions, a pure hydrocarbon, such as high purity n-heptane, at plus 99% content of the named hydrocarbon, can be used. Typical aryl alkyl hydrocarbons are ethyl benzene, toluene and xylene, ortho, meta or para-dimethylbenzene. Typical suitable cyclic compounds are cyclohexane and methyl cyclohexane.

Preferred solvents are those hydrocarbons having from 5 to 9 carbon atoms per molecule. Of course, isomers and mixtures of such hydrocarbon solvents are satisfactory. Most preferred hydrocarbon solvents contain 6–8 carbon atoms per molecule. Illustrative of an outstanding solvent within this class is a petroleum derivative identified as "heptane," a mixture of various hydrocarbon solvents of approximately 6 or 7 carbon atoms and sold by American Mineral Spirits Company and Esso Standard Oil Company.

This invention will be better understood but is not intended to be limited by the following illustrative examples:

Example 1

A composition, comprising 10 grams of α-bromoethylbenzene and 490 grams of β-bromoethylbenzene dissolved in 730 milliliters of commercial "Heptane," the alpha isomer constituting about 2% of the total bromoethylbenzene present, is gradually heated at atmospheric pressure to a pot temperature of 125° C. to obtain concurrent distillation of about 95% of the heptane. To the pot concentrate is added 50 parts per million by weight of zinc oxide powder based on the total weight of the bromoethylbenzene present. The resulting composition is heated for two hours at 125° C. at atmospheric pressure and then distilled at a pot temperature of about 135° C. and absolute pressure of about 50 mm. mercury to obtain in the distillate 465 grams of substantially 100% pure β-bromoethylbenzene.

Example 2

Example 1 is repeated, except that the starting bromoethylbenzene composition contains about 40% alpha isomer (200 grams) and 60% beta isomer (300 grams). 90 parts per million by weight of zinc oxide are used and the admixture heated at 170° for five hours. Following distillation, the distillate measures 240 grams of substantially 100% pure β-bromoethylbenzene.

Example 3

Example 1 is repeated except that the original composition contains about 1% alpha isomer (5 grams) and 99% beta isomer (495 grams). 30 parts by weight of zinc oxide per million parts of the total composition are added and the resulting admixture heated for 25 minutes at 120° C. Following distillation, the distillate measures 470 grams of substantially 100% pure β-bromoethylbenzene.

Example 4

Example 1 is repeated except that substantially no solvent is used with equally satisfactory results.

The above examples can be repeated using other solvents, other amounts of components, and other process conditions, within the scope of this invention in practicing the process claimed hereafter.

The invention claimed is:

The process of separating beta-bromoethylbenzene from a composition of α-bromoethylbenzene and β-bromoethylbenzene which comprises the steps of (1) admixing in said composition from about 25 to 100 parts by weight of zinc oxide per million parts of said composition, (2) heating, and (3) distilling the resulting admixture.

References Cited in the file of this patent

UNITED STATES PATENTS

| | | |
|---|---|---|
| 2,082,946 | Fluchaire | June 8, 1937 |
| 2,935,535 | Asadorina | May 3, 1960 |
| 2,955,958 | Brown | Oct. 11, 1960 |